(12) United States Patent
Miller (10) Patent No.: US 10,423,858 B2
(45) Date of Patent: Sep. 24, 2019

(54) RADIAL HISTOGRAM MATCHING

(71) Applicant: ENT. SERVICES DEVELOPMENT CORPORATION LP, Houston, TX (US)

(72) Inventor: Joseph Miller, Boulder, CO (US)

(73) Assignee: ENT. SERVICES DEVELOPMENT CORPORATION LP, Houston, TX (US)

( * ) Notice: Subject to any disclaimer, the term of this patent is extended or adjusted under 35 U.S.C. 154(b) by 4 days.

(21) Appl. No.: 15/305,990

(22) PCT Filed: Jul. 21, 2014

(86) PCT No.: PCT/US2014/047441
§ 371 (c)(1),
(2) Date: Oct. 21, 2016

(87) PCT Pub. No.: WO2016/014020
PCT Pub. Date: Jan. 28, 2016

(65) Prior Publication Data
US 2017/0124425 A1    May 4, 2017

(51) Int. Cl.
*G06K 9/62* (2006.01)
*G06K 9/46* (2006.01)

(52) U.S. Cl.
CPC ......... *G06K 9/6212* (2013.01); *G06K 9/4642* (2013.01)

(58) Field of Classification Search
None
See application file for complete search history.

(56) References Cited

U.S. PATENT DOCUMENTS

| 5,175,808 A | 12/1992 | Sayre |
| 6,565,003 B1 | 5/2003 | Ma |

(Continued)

FOREIGN PATENT DOCUMENTS

| WO | WO-2010049850 | 5/2010 |
| WO | WO-2015039102 | 3/2015 |
| WO | WO-2015171815 | 11/2015 |

OTHER PUBLICATIONS

Belongie et al., "Shape Matching and Object Recognition Using Shape Contexts," Apr. 2002, IEEE Transactions on Pattern Analysis and Machine Intelligence, vol. 24, No. 24., pp. 509-522.

(Continued)

*Primary Examiner* — Mark Roz
(74) *Attorney, Agent, or Firm* — Sheppard Mullin Richter & Hampton LLP (57) ABSTRACT

An example radial histogram matching system may generate a target radial histogram by identifying pixels in an input digital image that are determined to be on, traversing each of the pixels in the input digital image one time to determine how many of the pixels that are turned on are contained in each sector of a circle and assigning to each elements of the target radial histogram the number of on pixels in that element. The system may also compare the target radial histogram to each of an initial and a sequence of rotated radial histograms to determine a match score for each of the comparisons, and identify an offset rotation between a baseline pattern digital image and the input digital image based on the match scores.

15 Claims, 9 Drawing Sheets

(56) References Cited

U.S. PATENT DOCUMENTS

| | | | |
|---|---|---|---|
| 6,640,008 | B1 | 10/2003 | Lee et al. |
| 7,142,727 | B2 | 11/2006 | Notovitz et al. |
| 7,545,384 | B2 | 6/2009 | Baumberg |
| 7,990,556 | B2 | 8/2011 | King et al. |
| 8,005,720 | B2 | 8/2011 | King et al. |
| 8,254,671 | B1* | 8/2012 | Roth ............... G06F 17/30846 382/165 |
| 8,387,891 | B1 | 3/2013 | Simon et al. |
| 8,432,399 | B2 | 4/2013 | Helfman et al. |
| 8,447,107 | B1* | 5/2013 | Dhua .................. G06K 9/4604 382/170 |
| 8,447,510 | B2 | 5/2013 | Fitzpatrick et al. |
| 8,503,723 | B2 | 8/2013 | Kubota |
| 8,682,071 | B1 | 3/2014 | Dhua et al. |
| 8,688,760 | B2 | 4/2014 | Tang |
| 8,744,196 | B2 | 6/2014 | Sharma et al. |
| 8,860,851 | B2 | 10/2014 | Goma et al. |
| 8,971,663 | B2 | 3/2015 | Jacobson et al. |
| 9,033,238 | B2 | 5/2015 | Davis |
| 9,147,258 | B2 | 9/2015 | Thiruvenkadam et al. |
| 2004/0202349 | A1 | 10/2004 | Erol et al. |
| 2008/0200153 | A1 | 8/2008 | Fitzpatrick et al. |
| 2010/0113091 | A1 | 5/2010 | Sharma |
| 2011/0264527 | A1 | 10/2011 | Fitzpatrick et al. |
| 2011/0286627 | A1 | 11/2011 | Takacs et al. |
| 2012/0082385 | A1 | 4/2012 | Xu et al. |
| 2012/0148091 | A1 | 6/2012 | Kansal et al. |
| 2012/0258697 | A1 | 10/2012 | Fitzpatrick et al. |
| 2013/0045751 | A1 | 2/2013 | Chao et al. |
| 2013/0129216 | A1 | 5/2013 | Tsai et al. |
| 2014/0072217 | A1* | 3/2014 | Xu ...................... G06K 9/3275 382/170 |
| 2014/0142907 | A1 | 5/2014 | Gellaboina et al. |
| 2014/0232891 | A1 | 8/2014 | Cassanego |
| 2014/0241582 | A1 | 8/2014 | Gaddy et al. |
| 2015/0078658 | A1 | 3/2015 | Lee |
| 2016/0343126 | A1 | 11/2016 | Miller et al. |

OTHER PUBLICATIONS

International Searching Authority, "Notification of Transmittal of the International Search Report and the Written Opinion", PCT/US2016/015654, dated Oct. 21, 2016, 11 pages.

Takacs et al., "Fast Computation of Rotation-Invariant Image Features by an Approximate Radial Gradient Transform," Aug. 2013, IEEE Transactions on Image Processing, vol. 22, No. 8, pp. 2970-2982.

Zhu et al., "Automatic Document Logo Detection," 2007, ICDAR 2007, Ninth International Conference on Document Analysis and Recognition, vol. 2., <http://www.umiacs.umd.edu/~zhugy/LogoDetection_ICDAR2007.pdf>.

A Method Using Morphology and Histogram for Object-based Retrieval in Image and Video Databases—Thi Thi Zin and Hiromitu Hama—IJCSNS International Journal of Computer Science and Network Security vol. 7 No. 9, Sep. 2007.

Baratis Evdoxios, "Automatic Logo and Trademark Extraction from Large Corporate Web Sites," 2005, Dissertation Thesis, <http://www.intelligence.tuc.gr/lib/downloadfile.php?id=247>.

Becker, G.C., "The Alisa Shape Module Adaptive Shape Recognition Using a Radial Feature Token", Abstract, 2002, 2 pages. <http://dissertation.com/book.php?method=ISBN&book=1581121520>.

Chauhry, A.R. et al.; Ophthalmologic Image Registration Based on Shape-context: Application to Fundus Autofluorescence (FAF) Images; http://cmm.ensmp.fr/~parra/Image_reg_final.pd; Sep. 2008.

Dean Takahashi, "How Google Goggles works to deliver visual search results for mobile phones," Aug. 23, 2010, <http://venturebeat.com/2010/08/23/how-google-goggles-works-to-deliver-visual-search-results-for-mobile-phones/>.

Dong, W., et al.; Efficiently Matching Sets of Features with Random Histogram; http://www.cs.princeton.edu/cass/papers/mm08.pdf; Oct. 26-31, 2008.

International Searching Authority, "Notification of Transmittal of the International Search Report and the Written Opinion", PCT/US2016/015619, dated Oct. 19, 2016, 14 pages.

Jeff Salton, "What's in a name? Google Goggles lets you search the web with pictures," Dec. 8, 2009, <http://www.gizmag.com/google-goggles-picture-searching/13551/>.

Mark Milian, "How Google is teaching computers to see," Apr. 15, 2011, <http://www.cnn.com/2011/TECH/innoyation/04/14/google.goggles/>.

MengXiang et al., "What is the algorithm used by Google's reverse image search (i.e. search by image)?," Jun. 5, 2012-Aug. 31, 2014, <https://www.quora.com/What-is-the-algorithm-used-by-Googles-reverse-image-search-i-e-search-by-image>.

Milan Broum, "Open your eyes: Google Goggles now available on iPhone in Google Mobile App," Oct. 5, 2010, <http://googlemobile.blogspot.com/2010/10/open-your-eyes-google-goggles-now.html>.

Nathan Chandler, "What is Google Goggles?," Jul. 3, 2012, <http://electronics.howstuffworks.com/gadgets/other-gadgets/google-goggles.htm/printable>.

PCT Search Report/Written Opinion—Application No. PCT/US2014/047441 dated Feb. 11, 2015—12 pages.

Rafkind, B. et al, "Angular Radial Edge Histogram", Columbia University, Nov. 5, 2006, 16 pages <http://www.ee.columbia.edu/in/dvmm/publications/06/barry-WHmap-06.pdf>.

Shah et al., "Handwritten Character Recognition using Radial Histogram," International Journal of Research in Advent Technology, vol. 2, No. 4, Apr. 2014, <http://www.ijrat.org/downloads/april-2014/paper%20id-24201433.pdf>.

Thaker et al., "Structural Feature Extraction to recognize some of the Offline Isolated Handwritten Gujarati Characters using Decision Tree Classifier," International Journal of Computer Applications, vol. 99, No. 15, Aug. 2014, <http://research.ijcaonline.org/volume99/number15/pxc3898381.pdf>.

Y. Yemez et al.; 3D Reconstruction of Real Objects with High Resolution Shape and Texture; http://home.ku.edu.tr/~yyemez/IVC2004.pdf ; Jun. 23, 2004.

* cited by examiner

RADIAL HISTOGRAM MATCHING

BACKGROUND

Digital images may be created by, for example, digital cameras and then processed by computers in a variety of ways. Two different digital images may be compared with each other using automated machine processes to determine similarities and differences between the images. For example, two different digital images may be compared to determine if they are substantially identical or contain an identical object. Digital images may be stored in a variety of formats and may be transcoded from one format into another format, for example in a format that supports more efficient storage and electronic communication transport of the digital image. Digital images may represent an image as an array or matrix of pixels or picture elements. Each pixel may have a value or a plurality of values that represent the subject picture element of the subject image (e.g., a small picture element of an image of a cat) as an integer value. For example, a grey scale digital image may represent each pixel element as an integer in the range of 0 to 255, where 0 is black, 255 is white, and intermediate numbers are intermediate between black and white. Alternatively, a color image may represent each pixel element by three integer values, each integer value representing the intensity of the color tone in one of a set of primary colors, such as red, green, and blue. Other value ranges are used in different circumstances.

BRIEF DESCRIPTION OF THE DRAWINGS

For a detailed description of various examples, reference will now be made to the accompanying drawings in which.

DETAILED DESCRIPTION

Certain terms are used throughout the following description and claims to refer to particular system components. As one skilled in the art will appreciate, different companies may refer to a component by different names. This document does not intend to distinguish between components that differ in name but not function. In the following discussion and in the claims, the terms "including" and "comprising" are used in an open-ended fashion, and thus should be interpreted to mean "including, but not limited to . . . " Also, the term "couple" or "couples" is intended to mean either an indirect or direct wired or wireless connection. Thus, if a first device couples to a second device, that connection may be through a direct connection or through an indirect connection via other devices and connections.

When processing and/or comparing digital images it may be desirable to align a digital image before processing. Automatically aligning an input digital image with a baseline digital image before comparing the two images can improve the accuracy of the comparison. Alignment can be performed by rotating one digital image with respect to the other digital image, translating one digital image in 2-dimensions (e.g., in an x-axis direction and in a y-axis direction) with respect to the other digital image, or both rotating and translating one digital image with reference to the other digital image. Another digital image processing operation that may be performed before comparing two images is to adapt the scale of the two images so that the two images are compared according to a common scale. A variety of practical applications may involve this kind of pre-comparison alignment processing and scale processing. Several examples of applications are discussed below.

This disclosure teaches a novel creation of a radial histogram based on a digital image. Each pixel of a digital image is identified that has a pixel value that satisfies a pre-defined value threshold (e.g., has a value equal to or greater than 90 in a pixel value range from 0 to 255). Such pixels satisfying this condition are deemed "on" and may be referred to as on pixels or as on-pixels. A circular area of the digital image is selected and analyzed to produce a radial histogram, for example using machine instructions executed by a processing resource to automatically select and analyze on-pixels within the circular area of the digital image. The radial histogram comprises elements or values that correspond to sectors of the circular area. In an example, the radial histograms have 360 sectors, each sector subtending 1 degree. Every on-pixel that is located in a sector is counted and the count is assigned as the value of the corresponding element of the radial histogram. Each pixel is counted only once in at least some implementations, which enhances the accuracy of the histogram and improves the process of scaling of digital images. In an example, during the process of generating the radial histogram of a digital image, the maximum count of on-pixels in any element, the minimum count of on-pixels in any element, and the difference between the maximum count of on-pixels and the minimum count of on-pixels are determined. The difference between the maximum count of on-pixels and the minimum count of on-pixels may be referred to as the range of the histogram. The range may be used to scale between two different radial histograms being compared.

A radial histogram like that described above may be rotated by shifting the starting point or the index into the histogram. For example, a radial histogram comprising 360 elements can be rotated by one degree shifting the original first element to be the new second element, shifting the second original element to be the new third element, and so on, and shifting the original $360^{th}$ element to be the new first element. Any rotation may be performed by shifting the index accordingly. It is to be noted that this rotation need not involve moving the stored values of the elements but only shifting the index into a data structure (for example a circular data structure) containing the elements.

In an example, the baseline digital image is processed to generate an initial radial histogram. The initial radial histogram is then used to create histograms for each of the possible rotations of the radial histogram. For example, if the radial histogram has 360 elements, the initial radial histogram is generated and 359 different rotated radial histograms are generated from the initial radial histogram, each rotated radial histogram representing a one degree shift. The initial radial histogram and 359 rotated histograms may be stored once and used many times. In an example, the initial radial histogram is generated from a digital image of a tire tread pattern. The same tire tread pattern may be present on a large number of in-use tires on vehicles.

In an example, an input digital image is processed to generate a target radial histogram. The input digital image and the baseline digital image (to which the input digital image may be compared) may be images of substantially the same object or pattern in the world, but the images may be rotated, translated or out of scale with respect to each other. For example, a picture (e.g., the input digital image) taken of a tire tread pattern on a tire of a car may be rotated relative to the baseline digital image of the same tire tread pattern. Additionally, the picture may be translated relative to the baseline digital image of the same tire tread pattern. Finally, if the picture taken of the tire tread pattern on the tire of the car is taken either closer or farther away relative to the baseline digital image of the tire's tread, the scales of the two images may be different. These factors tend to impair successful pattern matching between digital images of the same object (e.g., a tire tread pattern).

In accordance with the disclosed implementations, the target radial histogram may be compared with each of the initial radial histogram and the rotated radial histograms. The best match identifies the rotational offset between the input digital image and the baseline digital image. Additionally, the same process can be used, by panning the circular analysis area across the target digital image and comparing the resultant target radial histogram to the initial radial histogram and the rotated radial histograms to find the best match between the input digital image and the baseline digital image. The comparisons may be performed taking scale offsets into account based on the range. When the rotational offset, translational offset, and scale offset between the input digital image and the baseline digital image are known, the input digital image and the baseline digital image can be aligned properly for further digital image processing. For example, the process may compare features on the input digital image of a tire tread patter to corresponding tire tread features on the baseline digital image of the tire tread pattern to determine an amount of tire tread wear and/or remaining tread life of a tire that is the subject of the input digital image.

Figure 1:
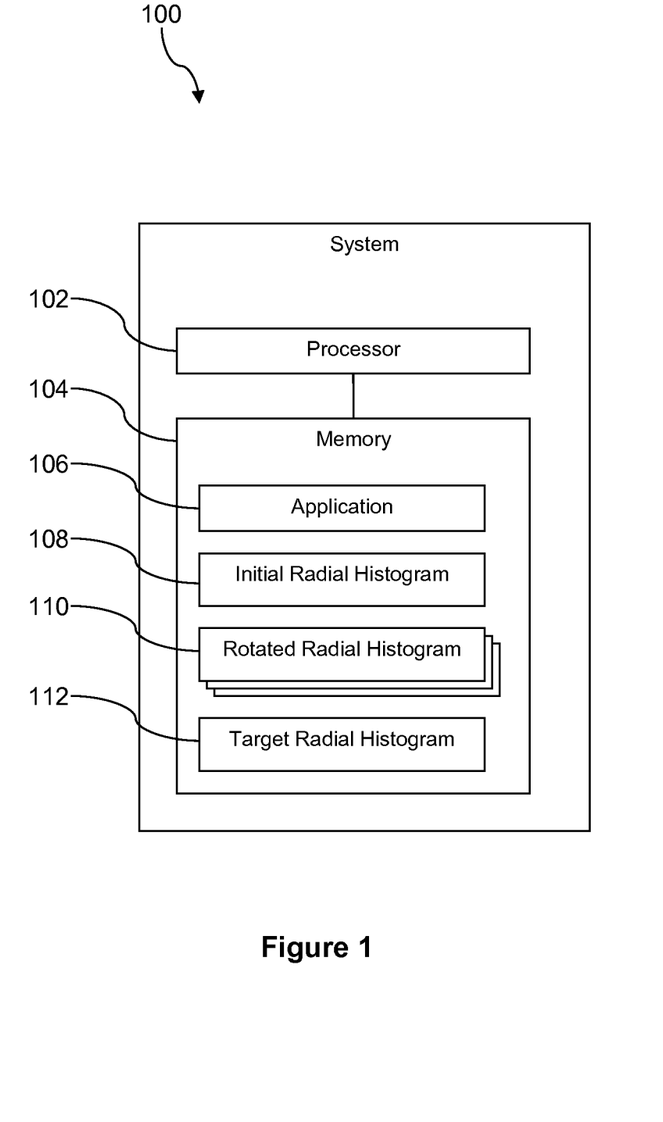
FIG. 1 shows a digital image processing system in accordance with various examples.

FIG. 1 shows a system 100 for digital image processing based on radial histograms, for example aligning an input digital image with a baseline digital image based on radial histograms of the digital images. This may have applications generally in automated shape recognition in digital images or in automated pattern recognition in digital images. In an example, the system 100 comprises a processor 102 coupled to memory 104. In an example, the system 100 may be a computer system such as a server computer. The memory 104 may store an application 106 which comprises machine instructions. The application 106 may also be referred to as a processing engine or as a plurality of processing engines. The application 106 may provide a variety of digital image processing operations, as discussed herein. All references herein to the functionality of the application 106 mean the processor 102 executing the application 106.

In an example, the application 106 may receive or access a baseline digital image, process it to generate an initial radial histogram 108, generate a plurality of rotated radial histograms 110 that are automatically rotated versions of the initial radial histogram, as will be described in more detail hereinafter. The application 106 may receive an input digital image, process it to generate a target radial histogram 112, and compare the target radial histogram 112 to each of the initial radial histogram 108 and the rotated radial histograms 110 to identify one radial histogram that compares most closely with the target radial histogram 112. The radial histogram that best matches to the target radial histogram 112 implies a rotational offset between the input digital image and the baseline digital image. For example, if a rotated radial histogram that is rotated 30 degrees with reference to the initial radial histogram 108 matches best to the target radial histogram 112, that indicates that the input digital image is rotated about 30 degrees relative to the baseline digital image. To perform further digital image processing of the input digital image relative to the baseline digital image, the input digital image may be corrected, for example by digitally rotating the input digital image by a negative 30 degrees. Alternatively, the baseline digital image could be digitally rotated a positive 30 degrees.

In an example, the initial radial histogram 108 and rotated radial histograms 110 may be generated by the application 106 and stored in memory outside the system 100, for example in a data store external to the system 100. Alternatively, the initial radial histogram 108 and rotated radial histograms 110 may be generated by a different application executed on a different computer system and stored in a data store external to the system 100. The initial radial histogram 108 and rotated radial histograms 110 of the baseline digital image may be generated once and stored for use many times in aligning an input digital image to the baseline digital image.

Figure 2A:
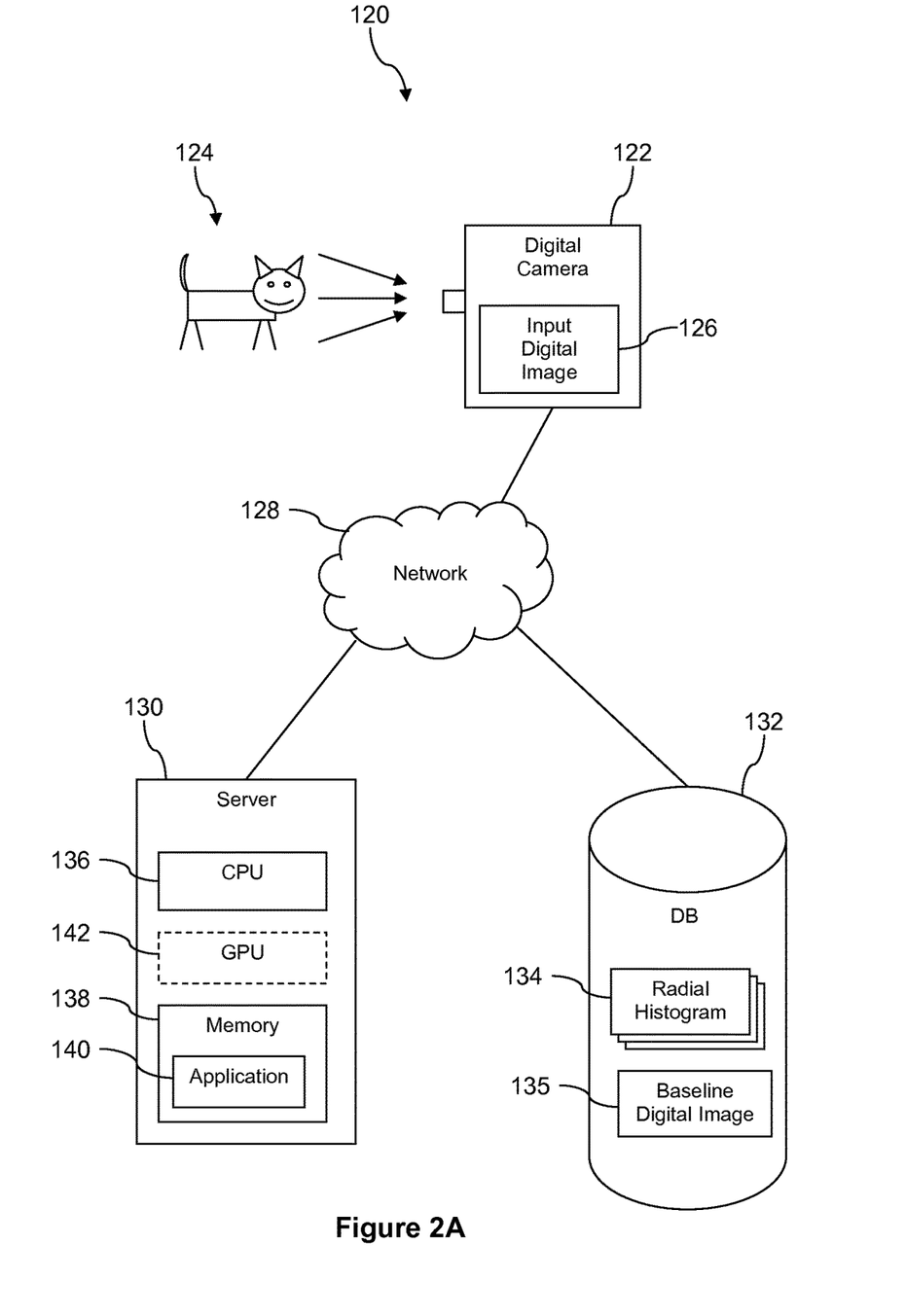
FIG. 2A shows another digital image processing system in accordance with various examples.

FIG. 2A shows a second system 120 that exemplifies one practical use of radial histograms in shape recognition or pattern recognition. The second system 120 comprises a digital camera 122 that takes a picture of an external object 124 to form an input digital image 126. While FIG. 2A illustrates the external object 124 as a cat, any object may be used.

The second system 120 further comprises a server computer 130. The digital camera 122 may transmit the input digital image 126 to the server computer 130 for digital image processing. The digital camera 122 may transmit the input digital image 126 via a network 128 to the server 130. The network 128 may comprise a public network, a private network, or a combination of networks. The digital camera 122 may be linked to the network through other nodes (not shown). For example, the digital camera 122 may download the input digital image 126 to a desktop computer (not shown) or a laptop computer (not shown), and the computer may transmit the input digital image 126 via wired and/or wireless links to the network 128 and thence to the server 130. Alternatively, the digital camera 122 may be embedded in a mobile communication device such as a mobile phone, and the mobile communication device may transmit the digital image 126 to the network 128 via wireless and wired links.

The server 130 comprises a central processing unit (CPU) 136 and a memory 138 that stores an application 140. The CPU 136 may be substantially similar to the processor 102 in FIG. 1; the memory 138 may be substantially similar to the memory 104 in FIG. 1; the application 140 may be substantially similar to the application 106 in FIG. 1. The second system 120 further comprises a data store 132 that stores radial histograms 134, for example the initial radial histogram 108 and the rotated radial histograms 110. The data store 132 may store a plurality of initial radial histograms and the rotated radial histograms associated with each of the initial radial histograms. The data store may also store a plurality of baseline digital images 135 from which each of the initial radial histograms 134 may be generated.

In an example, the application 140 may perform some of the digital image processing in a graphics processor unit (GPU) 142. The application 140 may perform the compares between a target radial histogram and each of the initial radial histogram and the rotated radial histograms in parallel in the GPU 142.

The application 140 may use the matching of the target radial histogram to the initial radial histogram and the rotated radial histograms to align the input digital image to the baseline digital image and then to perform further digital processing between the aligned input digital image and the baseline digital image. For example, a lost cat that corresponds to the external object 124 may be matched to an image of a cat reported as lost in a lost pet data store. Alternatively, a pattern located on an object to be automatically processed or handled in a manufacturing system or inventory control system may be photographed to produce the input digital image 126 and compared using radial histograms to align to a baseline digital image of a like pattern. The alignment of the input digital image 126 to the baseline digital image in this example may promote automatically processing or handling of the object. The teachings of the present disclosure have a wide range of applications.

Figure 2B:
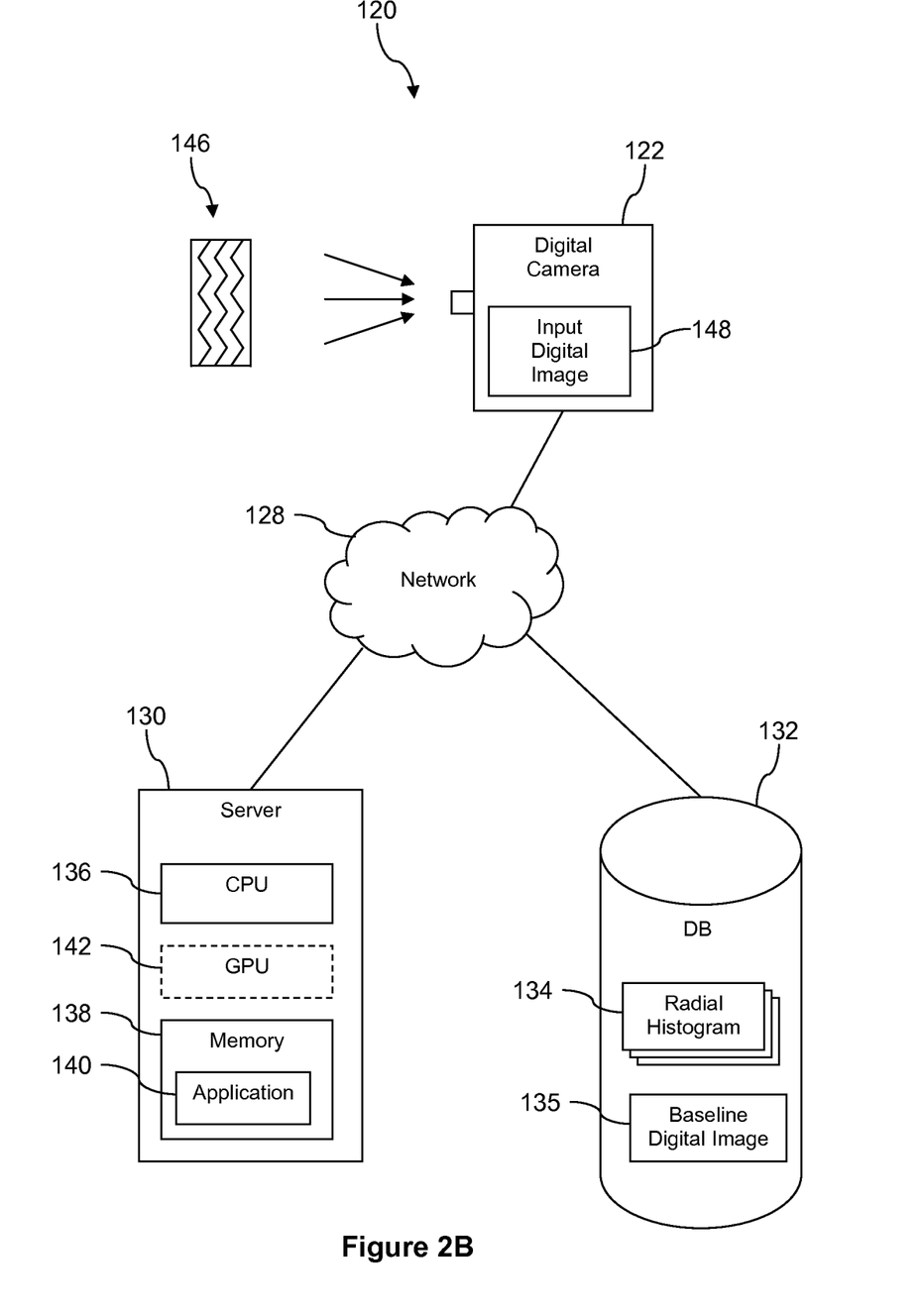
FIG. 2B shows yet another digital image processing system in accordance with various examples.

FIG. 2B shows the second system 120 in a different practical use of radial histograms in shape recognition or pattern recognition. A tire 146 is photographed by the digital camera 122 to create an input digital image 148. The application 140 may generate a target radial histogram by performing digital image processing of the input digital image 148. The application 140 may then compare the target radial histogram of the input digital image 148 to an initial radial histogram and associated rotated radial histograms, where the initial radial histogram has been generated by digital image processing of a baseline digital image of a tire tread pattern. For example, the baseline digital image may be a picture of a brand new tire of a specific make and model. The input digital image 148 may be a picture of a used tire of the same specific make and model, for example a tire mounted on a wheel of a car driven by a user of a mobile phone in which the digital camera 122 is embedded.

The application 140 determines the best match between the target radial histogram and the initial and rotated radial histograms, and uses this best match to determine a possible rotational alignment of the input digital image 148 and the baseline digital image. In practice some additional alignments and compensations may be desirably performed before further processing the input digital image 148. For example, the compare process described above may be repeated while scanning across the input digital image 148 in a horizontal axis and in a vertical axis (x-axis and y-axis) to find a best match. This position of best match may be used to translate the input digital image 148 relative to the input digital image. Additionally, the scale of the input digital image 148 may be adapted to compare more accurately with the baseline digital images. These operations are described in further detail hereinafter.

When rotationally aligned, translationally aligned, and scaled, the input digital image 148 and the baseline digital image may be analyzed to determine a ratio between a tread height of the tire 146 and the tread height of another tire of the same make and model. For example, a ratio of 1:10 may indicate that the tire 146 has reached an end of the life of the tire and a ratio of 2:10 may indicate that 12% of the tire life remains. This information may be used to recommend to a driver of the vehicle on which the tire 146 is mounted to bring the vehicle in to replace the tire 146 with a new tire.

Figure 3:
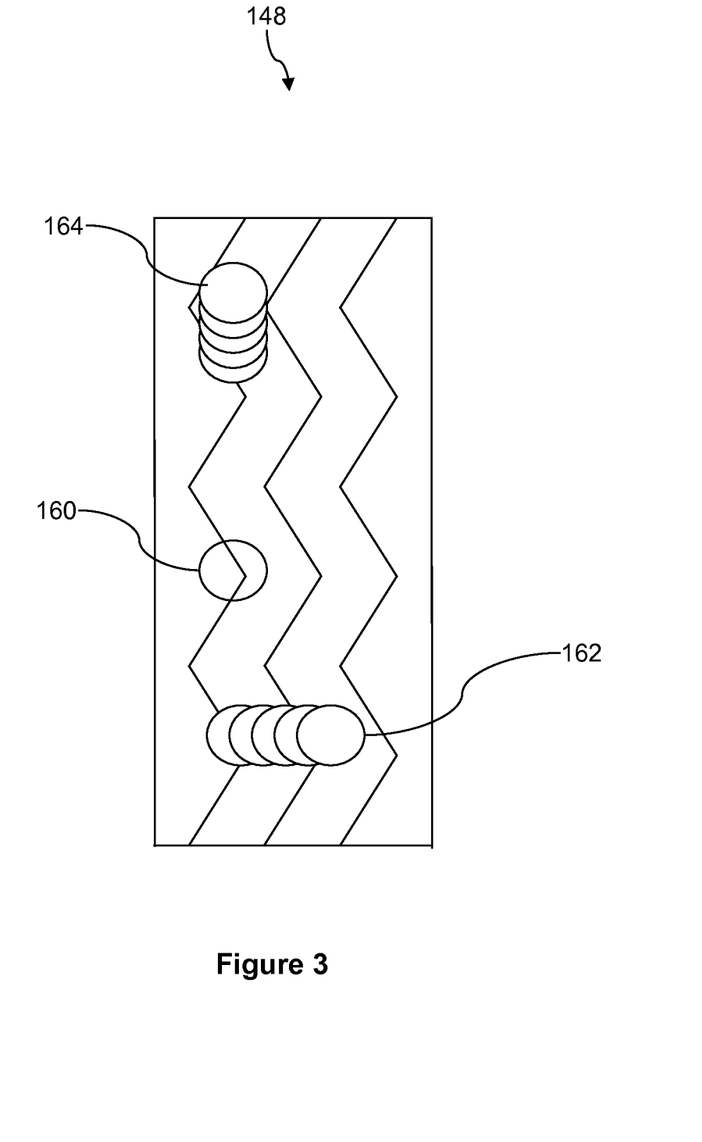
FIG. 3 shows a circular area used in a digital image processing scan in accordance with various examples.

FIG. 3 shows some digital image processing of the input digital image 148. A circular area 160 is logically positioned over the extent of the larger input digital image 148, and the digital image in the area covered by the circular area 160 is processed according to a digital image processing operation to create a radial histogram. For example, all the pixels of the input digital image 148 that are determined to be located within the circular area 160 are processed or analyzed according to a digital image processing operation to create a radial histogram. The circular area 160 may be defined by a pixel that serves as an origin or center of the circular area 160 and by a maximum radius (PRmax). In an example, the maximum radius may be designated in numbers of pixels.

In another example, the input digital image 148 may be processed by a different abstract shape defined to cover a portion of the digital image. For example, an annular structuring element (SE) may be defined by a center, a maximum radius (PRmax), and a minimum radius (PRmin).

The center of the circular area 160 may be logically positioned over every pixel of the input digital image 148 sequentially and a target radial histogram generated for each positioning. In an example, some optimizations may be employed. For example, the generation of radial histograms may be done locating the center circular area 160 so the whole circular area is within the input digital image 148, for example at least a radius of the circle inside a perimeter of the input digital image 148. In another example, the center of the circular area 160 may be offset each sequential time by two pixels, by three pixels, by four pixels, or some other number of pixels, whereby the number of radial histograms generated may be reduced. This process can be referred to as scanning, for example scanning in an x-axis 162 and scanning in a y-axis 164.

Figure 4A:
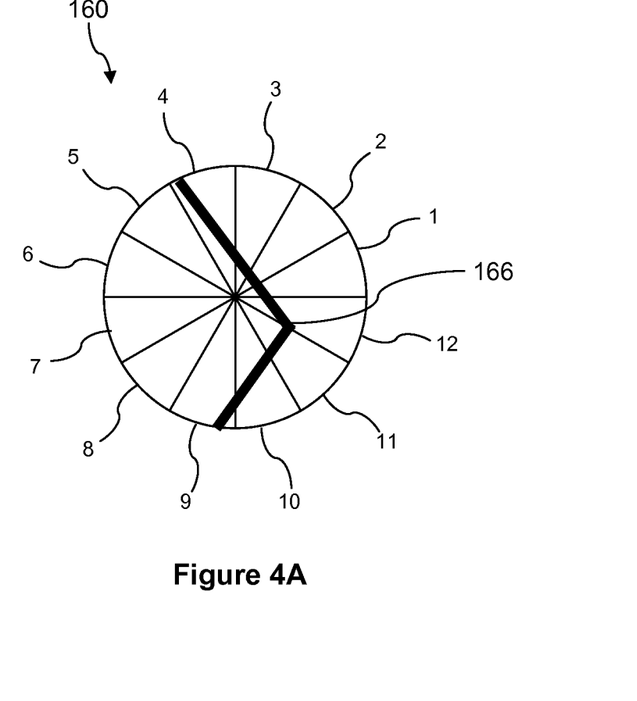
FIG. 4A, FIG. 4B, FIG. 4C, and FIG. 4D show different aspects of a digital image processing operation in accordance with various examples.

FIG. 4A shows the circular area 160 logically covering a portion of the input digital image 148. A portion of a tread pattern 166 covered by the circular area 160 is shown. The circular area 160 is logically partitioned into a plurality of sectors 1-12. The number of pixels in the digital image 148 that are deemed on-pixels in each of the sectors are counted, and elements of the histogram are given a value corresponding to the number of on-pixels counted in the element. The sectors may be defined by a minimum angle (Dmin) and a maximum angle (Dmax) associated with the sector.

Figure 4B:
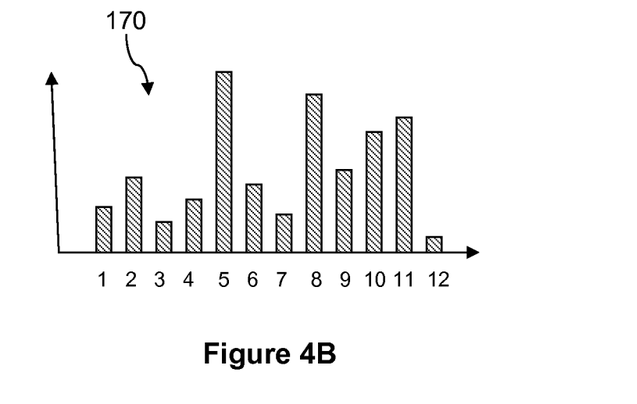

FIG. 4B shows a radial histogram 170. Each element is assigned a value represented by the height of a cross-hatched bar. The value of each element corresponds to the number of on-pixels counted in each sector 1-12. In an example, the input digital image 148 may be analyzed to create a matrix that represents all the on-pixels and all the off-pixels, for example a matrix having as many elements as the input digital image 148 has pixels, and the matrix of on-pixels may be analyzed to determine the radial histogram. Each pixel of the input digital image 148 may be analyzed to determine if a value of the pixel meets or exceeds a pre-defined criterion, for example if a grey scale value of the pixel that may range from 0 to 255 is at least 90 or more. Alternatively, the pre-defined threshold may be a red color value of the pixel that may range from 0 to 255 is at least 90 or more. In other examples, other pixel value categories may be used and different pre-defined criteria may be used.

The generation of the radial histograms disclosed herein count any pixel in only one of the sectors 1-12. Counting pixels only once may increase the accuracy of the radial histograms and contribute to more accurate matching between the target radial histogram and the initial and rotated radial histograms. In an example, the processing of the radial histogram is conducted by traversing all of the pixels one-by-one. Because a pixel is not processed again after initial traversing, the double counting or over counting of pixels in generating the radial histogram is avoided.

Figure 4C:
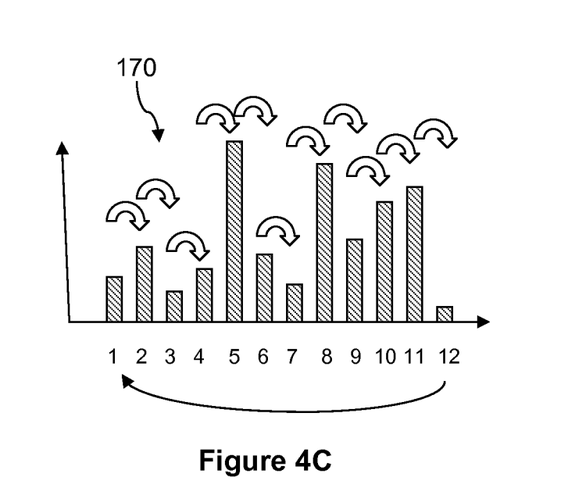
Figure 4D:
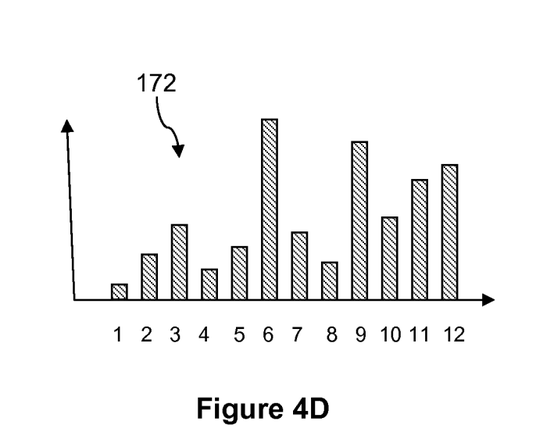

FIG. 4C and FIG. 4D illustrate the processing a radial histogram to generate a rotated radial histogram. The process may be performed by shifting each element from a source histogram circularly by one sector. Thus, the unshifted value of the first element becomes the shifted value of the second element, the unshifted value of the second element becomes the shifted value of the third element, and the unshifted value of the twelfth element becomes the shifted value of the first element. A radial histogram 172 conceptually illustrates the radial histogram 170 rotated by one sector. A variety of approaches to performing this digitally may be employed. Separate blocks of memory may contain rotated radial histograms, by copying to shifted locations. Alternatively, rotated radial histograms may be stored as an index into a circular data structure.

While FIG. 4A shows a circular area 160 that is partitioned into 12 sectors, in other examples the circular area 160 may be partitioned into different numbers of sectors. In an example, the circular area 160 is partitioned into 360 sectors, each sector subtending about 1 degree. The radial histograms 170 and 172 are conceptually illustrated by bar graphs, but it is understood that the radial histograms may be stored in any suitable data structure, for example in a circular data structure, in an array, or in another data structure.

Figure 5:
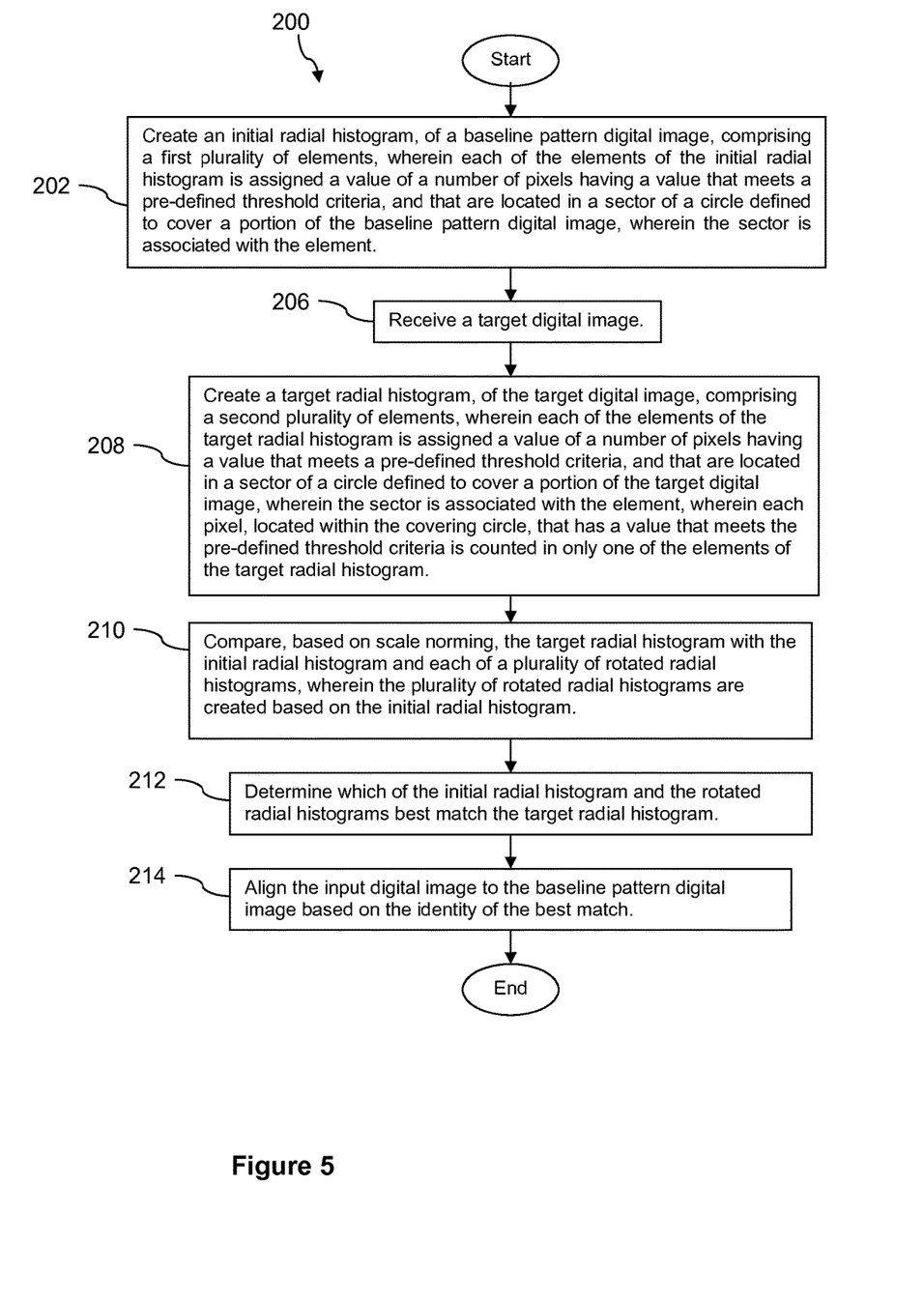
FIG. 5 shows a flow of a method in accordance with various examples.

FIG. 5 shows a method 200. The method may be performed by the hardware described herein (e.g., the hardware of FIGS. 6 and 7). At block 202, create an initial radial histogram, of a baseline pattern digital image, comprising a first plurality of elements, wherein each of the elements of the initial radial histogram is assigned a value of a number of pixels having a value that meets a pre-defined threshold criteria, and that are located in a sector of a circle defined to cover a portion of the baseline pattern digital image, wherein the sector is associated with the element. In an example, each pixel located within the covering circle that has a value that meets the pre-defined threshold criteria is counted in only one of the elements of the initial radial histogram. In an example, a plurality of rotated radial histograms may be created based on the initial radial histogram, where the rotated radial histograms are comprised of element values assigned shifted values of the element values of the initial radial histogram. At block 206, receive a target digital image.

At block 208, create a target radial histogram, of the target digital image, comprising a second plurality of elements, wherein each of the elements of the target radial histogram is assigned a value of a number of pixels having a value that meets a pre-defined threshold criteria, and that are located in a sector of a circle defined to cover a portion of the target digital image, wherein the sector is associated with the element, wherein each pixel located within the covering circle that has a value that meets the pre-defined threshold criteria is counted in only one of the elements of the target radial histogram. At block 210, compare, based on scale norming, the target radial histogram with the initial radial histogram and each a plurality of the rotated radial histograms, wherein the plurality of rotated radial histograms are created based on the initial radial histogram.

For example, for each of the target radial histogram and the initial radial histogram a maximum value of an element may be determined, a minimum value of an element may be determined, and a range of the radial histogram may be determined as the difference between the maximum value and the minimum value. If the physical scaling of the input digital image is not the same as the physical scaling of the baseline digital image, the range of the radial histograms will be different. The radial histograms may be scaled to each other based on their respective ranges. For example, if the range of the target radial histogram is 2 times the range of the initial radial histogram, the values of the elements of the target radial histogram may be divided by 2 before comparing to the elements of the initial radial histogram and the rotated radial histograms. It is noted that the range of the rotated radial histograms will be the same as the range of the initial radial histogram, as these histograms contain the same values merely shifted to different elements. At block 212, determine which of the initial radial histogram and the rotated radial histograms best match the target radial histogram.

In an example, the method 200 may further determine that the best match satisfies a pre-defined alignment threshold. The processing may comprise determining how many angle sectors of the target radial histogram match exactly to the associated angle sectors of the compared radial histogram and determining that at least 90% of the angle sectors match exactly, 95% of the angle sectors match exactly, 99% of the angle sectors match exactly, or some other criterion. Alternatively, rather than counting exact matches, near exact matches may be counted.

At block 214, align the input digital image to the baseline pattern digital image based on the identity of the best match.

Figure 6:
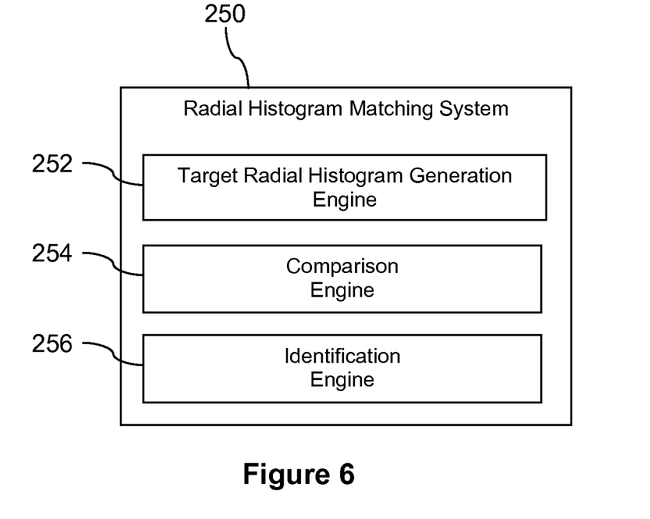
FIG. 6 shows a radial histogram matching system in accordance with various examples.

FIG. 6 shows a radial histogram matching system 250 that comprises a target radial histogram generation engine, a comparison engine 254, and an identification engine 256. In an example, the target radial histogram generation engine 252 generates a target radial histogram by identifying pixels in the input digital image that are determined to be on based on a value of the pixel meeting a pre-defined threshold criteria, traversing each of the pixels in the input digital image one time to determine how many of the pixels that are turned on are contained in each of a plurality of sectors of a circle and assigning to each of a plurality of elements of the target radial histogram the number of on pixels in that element, wherein the plurality of sectors comprise the whole circle, and wherein a pixel that is on is counted in only one sector. In an example, the comparison engine to compare the target radial histogram to each of an initial radial histogram and a sequence of rotated radial histograms to determine a match score for each of the comparisons. In an example, the identification engine to identify an offset rotation between the baseline pattern digital image and the input digital image based on the match scores. Each of the engines 252-256 of FIG. 6 is implemented as a processor executing machine instructions.

Figure 7:
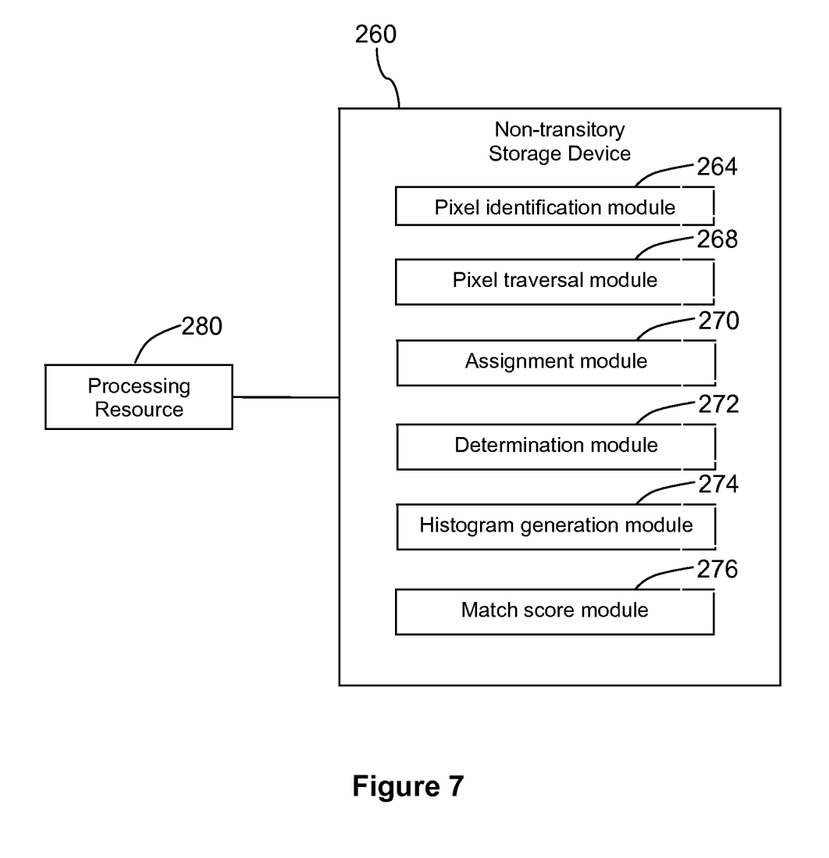
FIG. 7 shows a non-transitory storage device in accordance with various examples.

FIG. 7 shows a non-transitory storage device 260 comprising various software modules 264-276 which include machine instructions executable by a processing resource 280. The processing resource 280 may comprise a single processor, multiple processors, a single computer, or a network of computers. In an example, the processing resource may comprise one or more graphical processing units (GPUs). Each software module 264-276 provides functionality upon execution by the processing resource 280. Any reference herein to functionality performed by a particular module means the processing resource 280 executing the corresponding module. The various modules may be combined into one overall application or the functionality described herein as attributed to the modules may be implemented with fewer or more than the modules shown in the example of FIG. 7. The non-transitory storage device 260 may include volatile memory (e.g., random access memory), non-volatile storage (e.g., magnetic storage, optical storage, solid state storage), or combinations thereof.

Each engine 252-256 of FIG. 6 is implemented as the processing resource 280 executing one or more of the software modules 264-276.

Referring still to FIG. 7, the pixel identification module identifies pixels in a baseline pattern digital image that are determined to be on based on a value of the pixel meeting a pre-defined threshold criterion. The pixel traversal module 268 traverses each of the pixels in the baseline pattern digital image one time to determine how many of the pixels that are turned on are contained in each of 360 sectors of a circle. Each sector may subtend a degree of angle. For an implementation in which sector subtends a single degree, 360 sectors comprise the whole circle. A pixel that is on is counted in only one sector.

The assignment module 270 assigns to each of 360 elements of an initial radial histogram the number of on pixels in that element. The determination module 272 determines a maximum number of pixels counted in the 360 elements of the initial radial histogram, a minimum number of pixels counted in the 360 elements of the initial radial histogram, and a range of the initial radial histogram. The determined range is the difference between the maximum number of pixels and the minimum number of pixels counted in the 360 elements of the target radial histogram. The histogram generation module 274 generates 359 rotated radial histograms from the initial radial histogram by shifting the values of the initial radial histogram a number of elements based on the sequence position of each rotated radial histogram. The pixel identification module 264 identifies pixels in an input digital image that are determined to be on based on a value of the pixel meeting the pre-defined threshold criterion.

The pixel traversal module 268 also traverses each of the pixels in the input digital image one time to determine how many of the pixels that are turned on are contained in each of 360 sectors of a circle. Each sector may subtend a degree of angle, and, as explained above, the 360 sectors comprise the whole circle, and wherein a pixel that is on is counted in only one sector and to assign to each of 360 elements of the target radial histogram the number of on pixels in that element. The determination module 272 determines a maximum number of pixels counted in the 360 elements of the target radial histogram, a minimum number of pixels counted in the 360 elements of the target radial histogram, and the range of the target radial histogram (i.e., the difference between the maximum number of pixels and the minimum number of pixels counted in the 360 elements of the target radial histogram).

The match score module 276 determines 360 match scores, where each match score is determined by comparing the target radial histogram to a different one of the initial radial histogram and the 359 rotated radial histograms, wherein the comparisons take into account a scaling factor based on the ratio of the range of the initial radial histogram and the range of the target radial histogram. The match score module 276 also identifies an offset rotation between the baseline pattern digital image and the input digital image based on the match scores.

The above discussion is meant to be illustrative of the principles and various embodiments of the present invention. Numerous variations and modifications will become apparent to those skilled in the art once the above disclosure is fully appreciated. It is intended that the following claims be interpreted to embrace all such variations and modifications.

What is claimed is:

1. A non-transitory storage device including machine instructions that, when executed by a processing resource, cause the processing resource to:

identify pixels, in a baseline pattern digital image and in an input digital image, that are determined to be on based on a value of a respective pixel meeting a pre-defined threshold criterion;

traverse each of the pixels in the baseline pattern digital image and in the input digital image one time to determine how many of the pixels that are on are contained in each of 360 sectors of a circle, wherein each sector subtends a degree of angle, and wherein the 360 sectors comprise the whole circle;

assign to each of 360 elements of an initial radial histogram, and to each of 360 elements of a target radial histogram, the number of on pixels in that element;

determine a range of the initial radial histogram as a difference between a maximum number of pixels and a minimum number of pixels counted in the 360 elements of the initial radial histogram;

determine a range of the target radial histogram as a difference between a maximum number of pixels and a minimum number of pixels counted in the 360 elements of the target radial histogram;

determine 360 match scores, where each match score is determined by comparing the target radial histogram to a different one of the initial radial histogram and 359 rotated radial histograms, wherein the rotated radial histograms are generated based on the initial radial histogram, and wherein the comparisons take into account a scaling factor based on a ratio of the range of the initial radial histogram and the range of the target radial histogram; and identify, based on the match scores, an offset rotation between the baseline pattern digital image and the input digital image.

2. The non-transitory storage device of claim 1, wherein a pixel that is on is counted in only one sector.

3. The non-transitory storage device of claim 1, wherein the machine instructions, when executed by the processing resources, further cause the processing resource to:

determine a maximum number of pixels counted in the 360 elements of the initial radial histogram;

determine a minimum number of pixels counted in the 360 elements of the initial radial histogram;

determine a maximum number of pixels counted in the 360 elements of the target radial histogram; and determine a minimum number of pixels counted in the 360 elements of the target radial histogram.

4. The non-transitory storage device of claim 1, wherein the machine instructions, when executed by the processing resources, further cause the processing resource to generate 359 rotated radial histograms from the initial radial histogram by shifting the values of the initial radial histogram a number of elements based on the sequence position of each rotated radial histogram and further cause the processing resource to determine a 2-dimensional translation offset between the baseline pattern digital image and the input digital image based on the match scores.

5. The non-transitory storage device of claim 1, wherein the comparisons between of the target radial histogram to each of the initial radial histogram and the 359 rotated radial histograms are performed concurrently.

6. A non-transitory storage device including machine instructions that, when executed by a processing resource, cause the processing resource to:
   identify pixels, in a baseline pattern digital image and in an input digital image, that are determined to be on based on a value of a respective pixel meeting a pre-defined threshold criterion;
   traverse each of the pixels in the baseline pattern digital image and in the input digital image one time to determine how many of the pixels that are on are contained in each of N of sectors a circle, wherein N>1, wherein each sector subtends a degree of angle, and wherein the N sectors comprise the whole circle;
   assign to each of N elements of an initial radial histogram, and to each of N elements of a target radial histogram, the number of on pixels in that element;
   determine a range of the initial radial histogram as a difference between a maximum number of pixels and a minimum number of pixels counted in the N elements of the initial radial histogram;
   determine a range of the target radial histogram as a difference between a maximum number of pixels and a minimum number of pixels counted in the N elements of the target radial histogram;
   determine N match scores, where each match score is determined by comparing the target radial histogram to a different one of the initial radial histogram and N−1 rotated radial histograms, wherein the rotated radial histograms are generated based on the initial radial histogram, and wherein the comparisons take into account a scaling factor based on a ratio of the range of the initial radial histogram and the range of the target radial histogram; and
   identify, based on the match scores, an offset rotation between the baseline pattern digital image and the input digital image.

7. The non-transitory storage device of claim 6, wherein a pixel that is on is counted in only one sector.

8. The non-transitory storage device of claim 6, wherein the machine instructions, when executed by the processing resources, further cause the processing resource to:
   determine a maximum number of pixels counted in the N elements of the initial radial histogram;
   determine a minimum number of pixels counted in the N elements of the initial radial histogram;
   determine a maximum number of pixels counted in the N elements of the target radial histogram; and
   determine a minimum number of pixels counted in the N elements of the target radial histogram.

9. The non-transitory storage device of claim 6, wherein the machine instructions, when executed by the processing resources, further cause the processing resource to generate N−1 rotated radial histograms from the initial radial histogram by shifting the values of the initial radial histogram a number of elements based on the sequence position of each rotated radial histogram and further cause the processing resource to determine a 2-dimensional translation offset between the baseline pattern digital image and the input digital image based on the match scores.

10. The non-transitory storage device of claim 6, wherein the comparisons between of the target radial histogram to each of the initial radial histogram and the N−1 rotated radial histograms are performed concurrently.

11. A system comprising:
   a processing resource; and
   a non-transitory storage device including machine instructions that, when executed by the processing resource, cause the processing resource to:
      identify pixels, in a baseline pattern digital image and in an input digital image, that are determined to be on based on a value of a respective pixel meeting a pre-defined threshold criterion;
      traverse each of the pixels in the baseline pattern digital image and in the input digital image one time to determine how many of the pixels that are on are contained in each of N of sectors a circle, wherein N>1, wherein each sector subtends a degree of angle, and wherein the N sectors comprise the whole circle;
      assign to each of N elements of an initial radial histogram, and to each of N elements of a target radial histogram, the number of on pixels in that element;
      determine a range of the initial radial histogram as a difference between a maximum number of pixels and a minimum number of pixels counted in the N elements of the initial radial histogram;
      determine a range of the target radial histogram as a difference between a maximum number of pixels and a minimum number of pixels counted in the N elements of the target radial histogram;
      determine N match scores, where each match score is determined by comparing the target radial histogram to a different one of the initial radial histogram and N−1 rotated radial histograms, wherein the rotated radial histograms are generated based on the initial radial histogram, and wherein the comparisons take into account a scaling factor based on a ratio of the range of the initial radial histogram and the range of the target radial histogram; and
      identify, based on the match scores, an offset rotation between the baseline pattern digital image and the input digital image.

12. The system of claim 11, wherein a pixel that is on is counted in only one sector.

13. The system of claim 11, wherein the machine instructions, when executed by the processing resources, further cause the processing resource to:
   determine a maximum number of pixels counted in the N elements of the initial radial histogram;
   determine a minimum number of pixels counted in the N elements of the initial radial histogram;
   determine a maximum number of pixels counted in the N elements of the target radial histogram; and
   determine a minimum number of pixels counted in the N elements of the target radial histogram.

14. The system of claim 11, wherein the machine instructions, when executed by the processing resources, further cause the processing resource to generate N−1 rotated radial histograms from the initial radial histogram by shifting the values of the initial radial histogram a number of elements based on the sequence position of each rotated radial histogram and further cause the processing resource to determine a 2-dimensional translation offset between the baseline pattern digital image and the input digital image based on the match scores.

15. The system of claim 11, wherein the comparisons between of the target radial histogram to each of the initial radial histogram and the N−1 rotated radial histograms are performed concurrently.

* * * * *